United States Patent
Isobe et al.

(10) Patent No.: US 11,215,316 B2
(45) Date of Patent: Jan. 4, 2022

(54) STORAGE DEVICE

(71) Applicant: Panasonic Intellectual Property Management Co., Ltd., Osaka (JP)

(72) Inventors: Yuzuka Isobe, Osaka (JP); Yoshinari Matsuyama, Osaka (JP); Masaki Shikanai, Kanagawa (JP); Takeshi Kikuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/860,355

(22) Filed: Apr. 28, 2020

(65) Prior Publication Data

US 2020/0256507 A1 Aug. 13, 2020

Related U.S. Application Data

(63) Continuation of application No. PCT/JP2018/041251, filed on Nov. 6, 2018.

(30) Foreign Application Priority Data

Nov. 10, 2017 (JP) .............................. JP2017-217687

(51) Int. Cl.
 *B65D 21/02* (2006.01)
 *F16M 11/22* (2006.01)
 *H01M 50/20* (2021.01)

(52) U.S. Cl.
 CPC ......... *F16M 11/22* (2013.01); *B65D 21/0204* (2013.01); *B65D 21/0223* (2013.01); *H01M 50/20* (2021.01)

(58) Field of Classification Search
 USPC ............. 248/310, 311.2, 312, 312.1, 346.01, 248/346.05, 346.06, 346.5, 500, 506, 907;
 (Continued)

(56) References Cited

U.S. PATENT DOCUMENTS 5,111,958 A * 5/1992 Witthoeft ................ B65F 1/006
 220/23.83
5,184,749 A * 2/1993 Attenasio ................ A47L 13/51
 15/257.01
(Continued)

FOREIGN PATENT DOCUMENTS

JP 6-12367 2/1994
JP 2007-143256 6/2007
(Continued)

OTHER PUBLICATIONS

Notice of Reasons for Refusal dated May 7, 2020 in corresponding Japanese Patent Application No. 2019-528166, with Machine Translation.
(Continued)

*Primary Examiner* — Alfred J Wujciak
(74) *Attorney, Agent, or Firm* — Wenderoth, Lind & Ponack, L.L.P.

(57) ABSTRACT

A storage device includes a storage body, which includes a bottom surface, wall surfaces surrounding a storage space, a front opening portion and an upper opening portion such that a package body is enabled to be inserted into the storage space from a plurality of directions, a front guide, which is provided on the bottom surface in proximity to the front opening portion, and includes an inclined surface descending toward a surface on a back side of the storage space among the wall surfaces, and a rear guide, which is provided on the surface on the back side in proximity to the upper opening portion, and restricts upward movement of the package body stored in the storage space along the surface on the back side.

10 Claims, 16 Drawing Sheets

(58) Field of Classification Search
USPC ....... 220/500, 503, 504, 505, 529, 532, 533,
220/534, 535, 544, 541, 545, 546, 23.89,
220/23.87, 23.86, 23.83, 608, 675, 669
See application file for complete search history.

(56) References Cited

U.S. PATENT DOCUMENTS

| | | | |
|---|---|---|---|
| 5,417,338 A * | 5/1995 | Roy | ........................ B65F 1/006 |
| | | | 220/23.4 |
| 6,722,672 B2 * | 4/2004 | Cates | ........................ B62B 1/10 |
| | | | 280/47.26 |
| 8,181,807 B2 * | 5/2012 | Hay | ................... B65D 90/0033 |
| | | | 220/8 |
| 2012/0292316 A1 * | 11/2012 | Gerard | .................... B65F 1/141 |
| | | | 220/23.87 |
| 2013/0016463 A1 | 1/2013 | Hiramoto et al. | |
| 2013/0032508 A1 | 2/2013 | Azuma | |

FOREIGN PATENT DOCUMENTS

| | | |
|---|---|---|
| JP | 2009-246454 | 10/2009 |
| JP | 2010-166436 | 7/2010 |
| JP | 2011-238660 | 11/2011 |
| JP | 2013-025885 | 2/2013 |
| JP | 2014-079088 | 5/2014 |

OTHER PUBLICATIONS

International Search Report dated Jan. 22, 2019 in International (PCT) Application No. PCT/JP2018/041251 with English translation.

* cited by examiner

STORAGE DEVICE

CROSS REFERENCE TO RELATED APPLICATION(S)

This application is a continuation of International Patent Application No. PCT/JP2018/041251 filed on Nov. 6, 2018, which claims the benefit of priority of Japanese Patent Application No. 2017-217687 filed on Nov. 10, 2017, the contents of which are incorporated herein by reference in its entirety.

BACKGROUND OF THE INVENTION

1. Field of the Invention

The present disclosure relates to a storage device which stores an object to be stored.

2. Description of the Related Art

A charging stand according to JP-A-2014-79088 referred to as Patent Literature 1 is provided with a recessed portion into which an end portion of a portable terminal is inserted, and has a rectangular cross section orthogonal to an insertion direction of the recessed portion. A side portion corresponding to one side surface of the recessed portion is provided with a charging lever which includes an abutting portion abutting against the end portion of the portable terminal and a contact portion abutting against a terminal portion of the portable terminal. The charging lever is configured such that the abutting portion abuts against the end portion of the portable terminal while the contact portion protrudes from the one side surface of the recessed portion.

SUMMARY OF THE INVENTION

The present disclosure has been devised in view of the above-described situations in related art, and a non-limited object thereof is to provide a storage device capable of easily inserting an object to be stored and restraining the object placed therein from coming off upward in a vertical direction.

A storage device according to the present disclosure includes: a storage body, which includes a bottom surface, a wall surface surrounding a storage space, a front opening portion and an upper opening portion such that a package body is enabled to be inserted into the storage space from a plurality of directions; a front guide, which is provided on the bottom surface in proximity to the front opening portion, and includes an inclined surface descending toward a surface on a back side of the storage space among the wall surface; and a rear guide, which is provided on the surface on the back side in proximity to the upper opening portion, and restricts upward movement of the package body stored in the storage space along the surface on the back side.

According to the present disclosure, the object to be stored can be easily inserted, and the placed object to be stored can be restrained from coming off upward in the vertical direction.

DETAILED DESCRIPTION OF THE EXEMPLARY EMBODIMENTS

Background of Embodiment

As an example of a storage device in the related art, the recessed portion, into which an end portion of an object to be stored (for example, a portable terminal) is inserted, is provided in the charging stand according to Patent Literature 1 described above. The recessed portion has a rectangular cross section orthogonal to the insertion direction. In use, the storage device inserts the end portion of the object to be stored into the recessed portion. Since the insertion direction of the recessed portion is limited to one direction and an insertion opening of the recessed portion substantially matches a cross section of the object to be stored, the object to be stored is difficult to be inserted particularly when the object to be stored is heavy, so that usability is poor. Moreover, since the storage device is not provided with any holding portion, the object to be stored may be easily lifted upward (for example, upward in a vertical direction) from the recessed portion.

Therefore, in the following embodiment, an example of a storage device, which can easily insert the object to be stored and can also restrain the placed object to be stored from coming off in the vertical direction, will be described.

Hereinafter, an embodiment (hereinafter, referred to as "the present embodiment") that specifically discloses a storage device according to the present disclosure will be described in detail with reference to the drawings as appropriate. Unnecessarily detailed description may be omitted.

For example, a detailed description of a well-known matter or a repeated description of substantially the same configuration may be omitted. This is to prevent the following description from being unnecessarily redundant and to facilitate understanding of those skilled in the art. The accompanying drawings and the following description are provided for those skilled in the art to facilitate thorough understanding of the present disclosure, and are not intended to limit the claimed subject matters.

Figure 1:
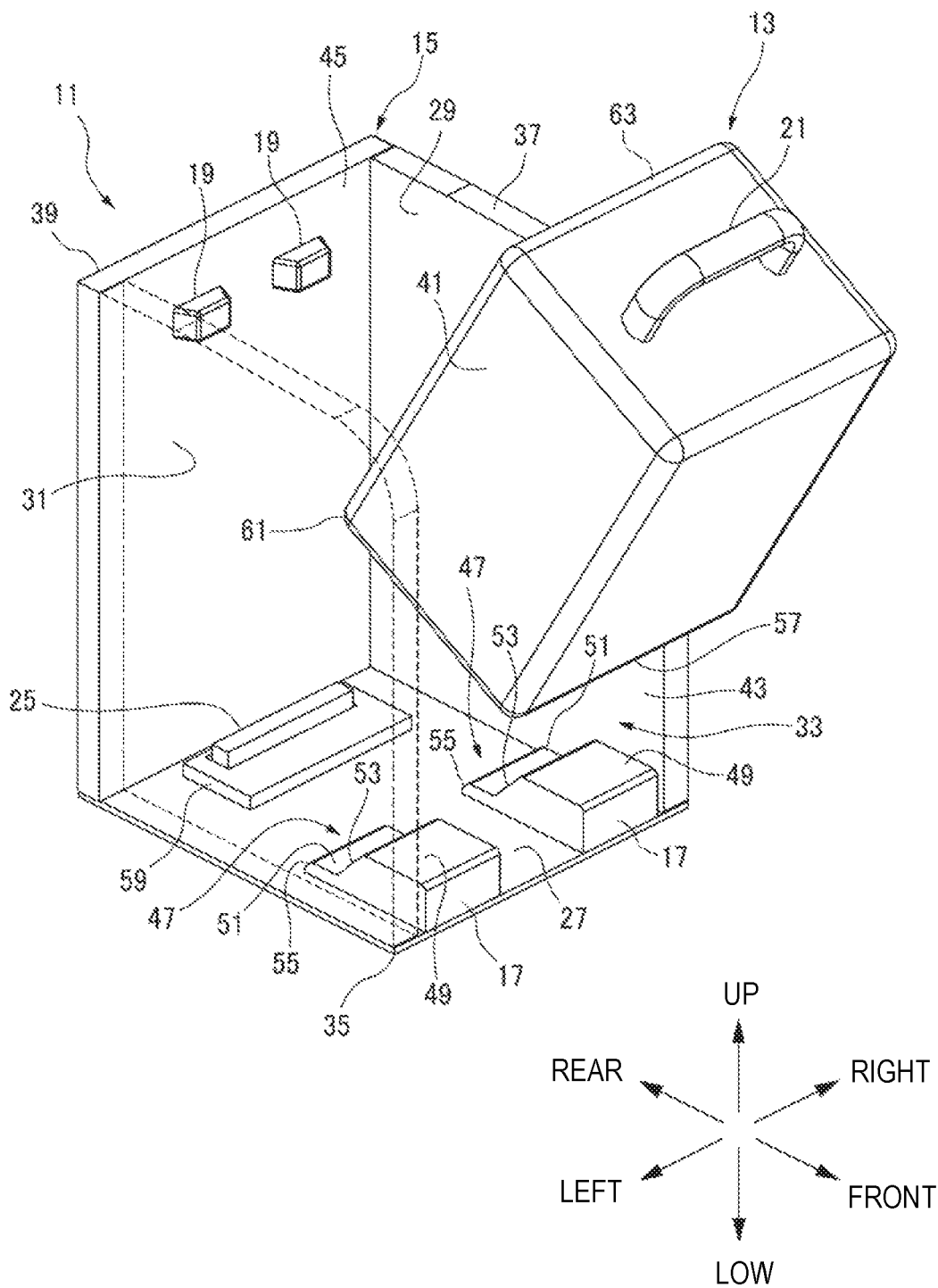
FIG. 1 is a perspective view showing a storage device according to an embodiment together with a package body.

FIG. 1 is a perspective view showing a storage device 11 according to the present embodiment together with a package body 13. In the present embodiment, upper and lower, front and rear, left and right directions follow directions of arrows shown in FIG. 1.

The storage device 11 according to the present embodiment includes a storage body 15, a front guide 17, and a rear guide 19 as main components.

The storage device 11 stores the package body 13 as an example of the object to be stored. In the present embodiment, the package body 13 is formed, for example, as a vertically elongated substantially rectangular parallelepiped. A handle 21 is provided on an upper surface of the package body 13 to make it easier for a person to grasp. Examples of application of the package body 13 include, for example, a rechargeable battery and a tank (for example, a tank into which water or kerosene is injected) serving as load bodies. The package body 13 may have a weight of, for example, about several Kg (kilograms) to 10 Kg (kilograms). A coupled portion 23 (see FIG. 5) is provided on a lower surface of the package body 13. The coupled portion 23 is coupled to a coupling portion 25 described below (see FIG. 5) provided on the storage device 11.

The coupled portion 23 provided on the package body 13 can be, for example, a female connector in which a female terminal is housed in a female housing made of an insulating resin. Meanwhile, the coupling portion 25 provided on the storage device 11 can be, for example, a male connector in which a male terminal is housed in a male housing made of an insulating resin.

Figure 2:
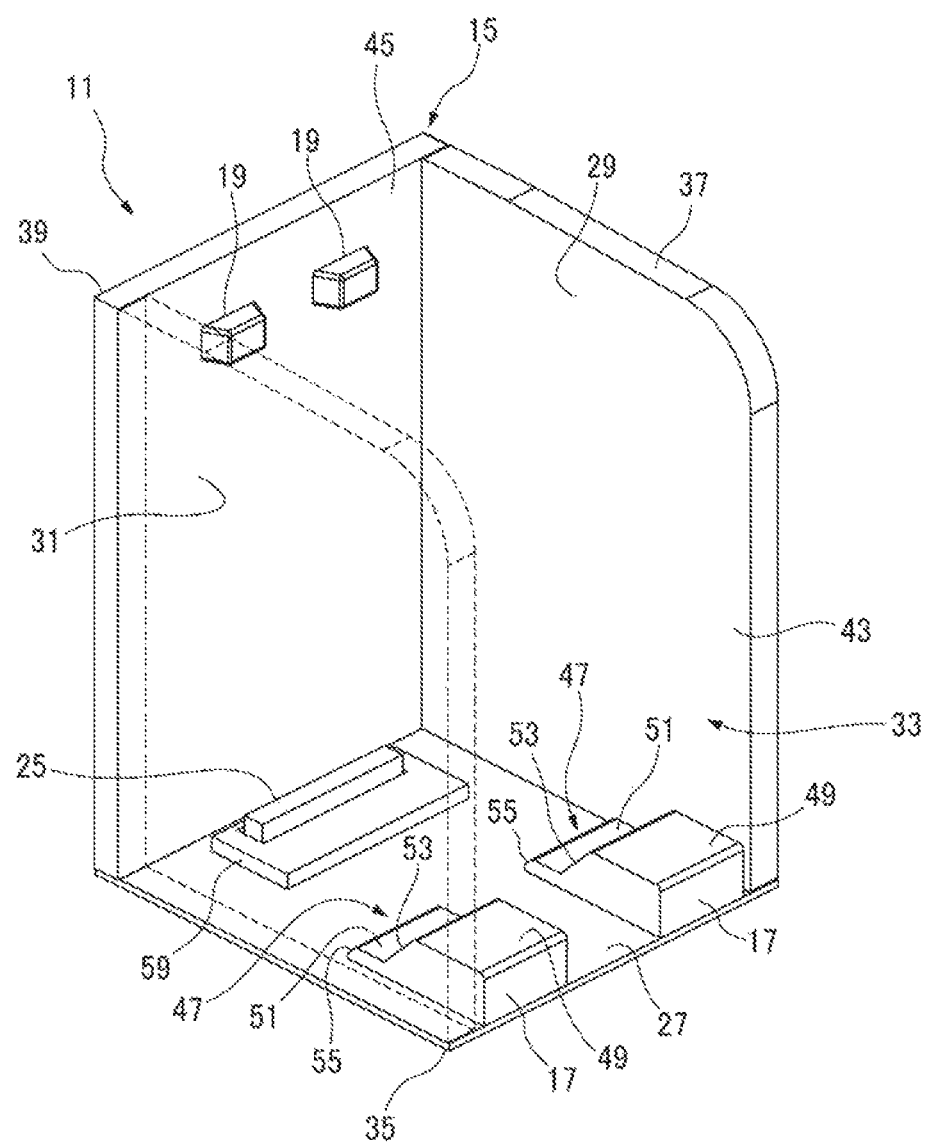
FIG. 2 is a perspective view of a storage body shown in FIG. 1.

The storage body 15 surrounds a storage space 33 (an example of a storage portion) by a bottom surface 27, a pair of parallel inner side surfaces 29, and a back surface 31. The bottom surface 27 is an upper side surface of a substantially square bottom plate 35. The pair of parallel inner side surfaces 29 are opposite surfaces of a pair of vertically elongated rectangular side plates 37. In FIGS. 1 and 2, the left side plate 37 and the inner side surface 29 are shown by dotted lines, for example, in order to make descriptions of the bottom surface 27, the coupling portion 25, a frame plate 59, the front guide 17, and the rear guide 19 easy to understand. The back surface 31 is a surface on a back side of the storage space 33 among wall surfaces surrounding the storage space 33 (for example, the pair of side plates 37 and the back surface 31). The back surface 31 stands substantially perpendicularly or perpendicularly from the bottom plate 35 and serves as a front side surface of a vertically elongated rectangular back plate 39 which connects the pair of side plates 37. The pair of parallel inner side surfaces 29 faces a pair of parallel package side surfaces 41 of the package body 13 with a slight clearance therebetween, so that insertion of the package body 13 is guided.

Members on which the bottom surface 27, the inner side surface 29 and the back surface 31 are formed are not limited to the bottom plate 35, the side plate 37 and the back plate 39, and may be a block body which does not have a plate shape. The bottom surface 27, the inner side surface 29 and the back surface 31 may also be integrally formed. Moreover, the pair of side plates 37 may not be parallel to each other, and may face each other obliquely, while heights thereof may be the same or different.

Since a front opening portion 43 and an upper opening portion 45 of the storage body 15 are continuous, the storage space 33 is opened to two orthogonal planes adjacent to each other. The storage body 15 allows the package body 13 to be inserted into the storage space 33 from a plurality of directions by using the front opening portion 43 and the upper opening portion 45 as insertion openings.

Here, the plurality of directions are, for example, inclination directions of the package body 13 at each rotation angle when the package body 13 is rotated with a virtual center that is elongated in a left-right direction serving as a rotational axis thereof. The inclination directions of the package body 13 are any angles in a range of inclination angles of 0° to 90°. The package body 13 can be inserted in any inclination direction within a range from an upright posture at an inclination angle of 0° where a longitudinal direction thereof becomes an up-down direction (vertical direction) to a horizontal posture at an inclination angle of 90° where the longitudinal direction becomes a front-rear direction (horizontal direction). That is, the storage device 11 can insert the package body 13 into the storage body 15 from any angle.

FIG. 2 is a perspective view of the storage body 15 shown in FIG. 1. The front guide 17 is provided on the bottom surface 27 in proximity to the front opening portion 43 between the pair of inner side surfaces 29. The front guide 17 is formed as a protruding portion which has a substantially trapezoidal shape in a side view.

In the present embodiment, the pair of front guides 17 are provided apart from each other in a direction along the back surface 31. The pair of apart left and right front guides 17 may also be integrally formed and connected to each other.

Figure 3:
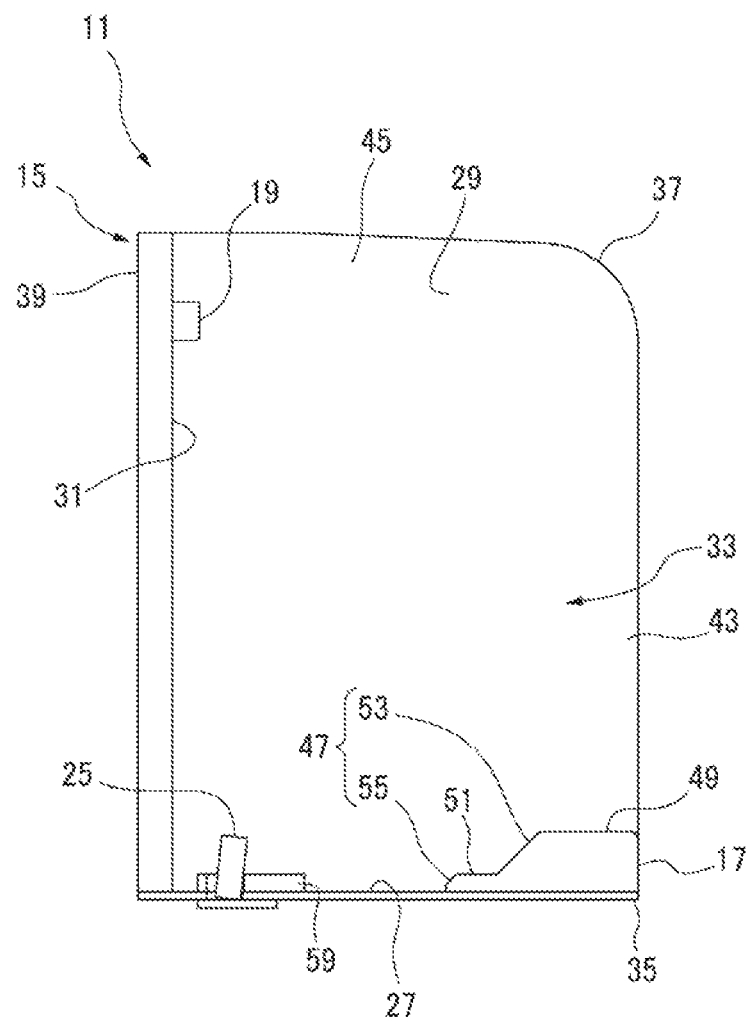
FIG. 3 is a side view of the storage body shown in FIG. 2.

FIG. 3 is a side view of the storage body 15 shown in FIG. 2. Each front guide 17 includes an inclined surface 47 descending toward the back surface 31.

In the present embodiment, the front guide 17 includes an upper step flat surface 49 which is in proximity to the front opening portion 43 and a lower step flat surface 51 located on a back surface side whose height from the bottom surface 27 is lower than that of the upper step flat surface 49. The inclined surface 47 includes an upper step inclined surface 53 which connects the upper step flat surface 49 and the lower step flat surface 51. The inclined surface 47 further includes a lower step inclined surface 55 which connects the lower step flat surface 51 and the bottom surface 27.

Therefore, the inclined surface 47 is a general term of the upper step inclined surface 53 and the lower step inclined surface 55.

The storage device 11 may have a configuration in which the lower step flat surface 51 and the lower step inclined surface 55 of the front guide 17 are omitted. In this case, the storage device 11 directly places the package body 13 on the bottom surface 27. In the present embodiment, as a result of placing a front edge portion 57 of a lower portion of the package body 13 on the lower step flat surface 51, the package body 13 is stored with a lower surface thereof floating above the bottom surface 27 (see FIG. 9).

Meanwhile, the rear guide 19 is provided on the back surface 31 in proximity to the upper opening portion 45. The rear guide 19 functions as a stopper that restricts upward movement (for example, upward in the vertical direction) of the package body 13 stored in the storage space 33 along the back surface 31. The rear guide 19 is formed as, for example, a protruding portion which has a quadrangular shape in a side view. In the present embodiment, the pair of rear guides 19 are provided apart from each other in the direction along the back surface 31. The pair of apart left and right rear guides 19 may also be integrally formed and connected to each other.

In the storage device 11, when the package body 13 is inserted into the storage body 15 from any angle, a movement trajectory of the package body 13 is determined by the front guide 17 and the rear guide 19 provided in the storage body 15.

The coupling portion 25 is provided closer to the back surface 31 than the front guide 17.

Since the coupling portion 25 includes a movable mechanism, after coming into contact with the coupled portion 23 of the package body 13, the coupling portion 25 is operated by a weight of the package body 13 in a direction to couple with the coupled portion 23.

In the storage device 11, the coupling portion 25 which is configured to fit in the package body 13 is provided on the bottom surface 27. Before coupling with the package body 13, a coupling direction of the coupling portion 25 is inclined forward in a direction toward the front opening portion 43. The coupling portion 25, which is in a forwardly inclining posture in a normal state, is movably provided such that the coupling portion 25 stands upright after coupling with the package body 13 while the coupling direction is directed upward along the back surface 31.

In the storage device 11, the package body 13 moves together with the operation of the coupling portion 25, and enters a position below the rear guide 19. As a result, lifting of the package body 13 upward in the vertical direction is restricted. In this way, in the storage device 11, the coupling between the package body 13 and the storage body 15 and prevention of the lifting of the package body 13 upward in the vertical direction are realized in a space-saving manner.

The coupling portion 25 is formed as the male connector which is elongated in the left-right direction. The male housing of the male connector is urged by a spring member or the like (not shown) in a direction of the forwardly inclining posture shown in FIG. 3. The coupling portion 25 is movably held in a posture standing in a direction perpendicular to the bottom surface 27 against an urging force of the spring member by applying a rearward external force (posture shown in FIG. 9).

In the present embodiment, the coupling portion 25 further protrudes from a protruding portion which protrudes from the bottom surface 27. The protruding portion may be the frame plate 59, a slide plate, or the like, which is formed in a rectangular plate shape. A height of the protruding portion from the bottom surface 27 is the same as a height of the lower step flat surface 51 from the bottom surface 27. A rear edge portion 61 (see FIG. 9) of the lower portion of the package body 13 is placed on the protruding portion. Therefore, the front edge portion 57 of the lower portion is placed on the lower step flat surface 51 while the rear edge portion 61 of the lower portion is placed on the protruding portion, so that the package body 13 is floated from the bottom surface 27 and stored horizontally.

Next, a method of storing the package body 13 in the storage device 11 will be described.

Store from Front Opening Portion

Figure 4:
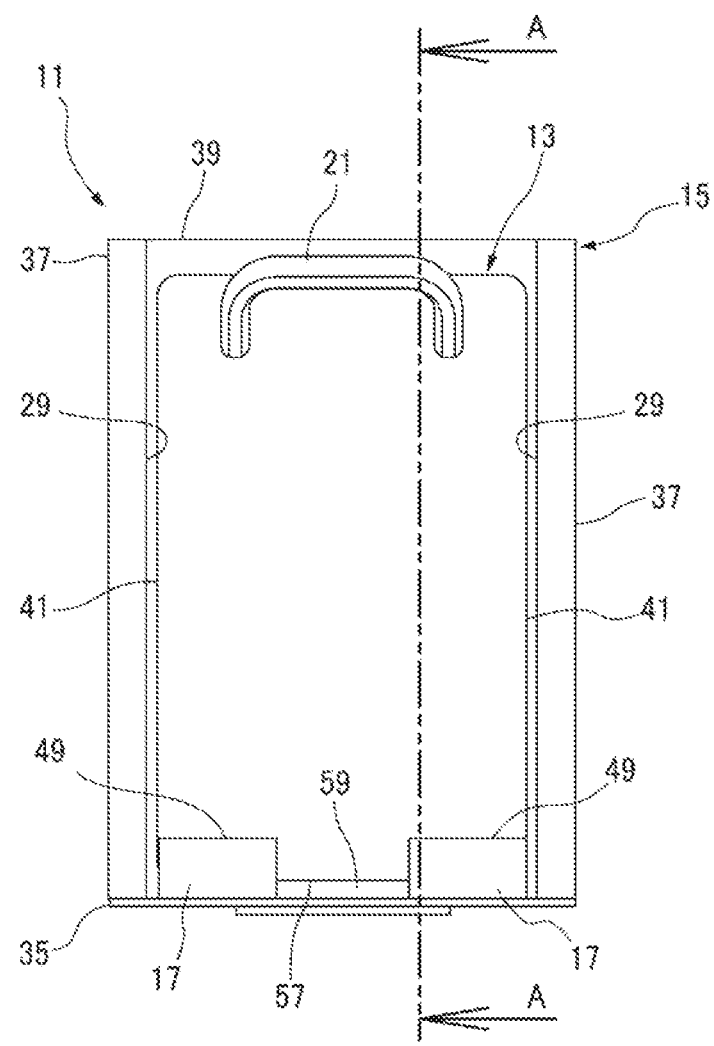
FIG. 4 is a front view of the storage body and the package body whose front edge portion is grounded for explaining an operation of storing from a front opening portion.
Figure 5:
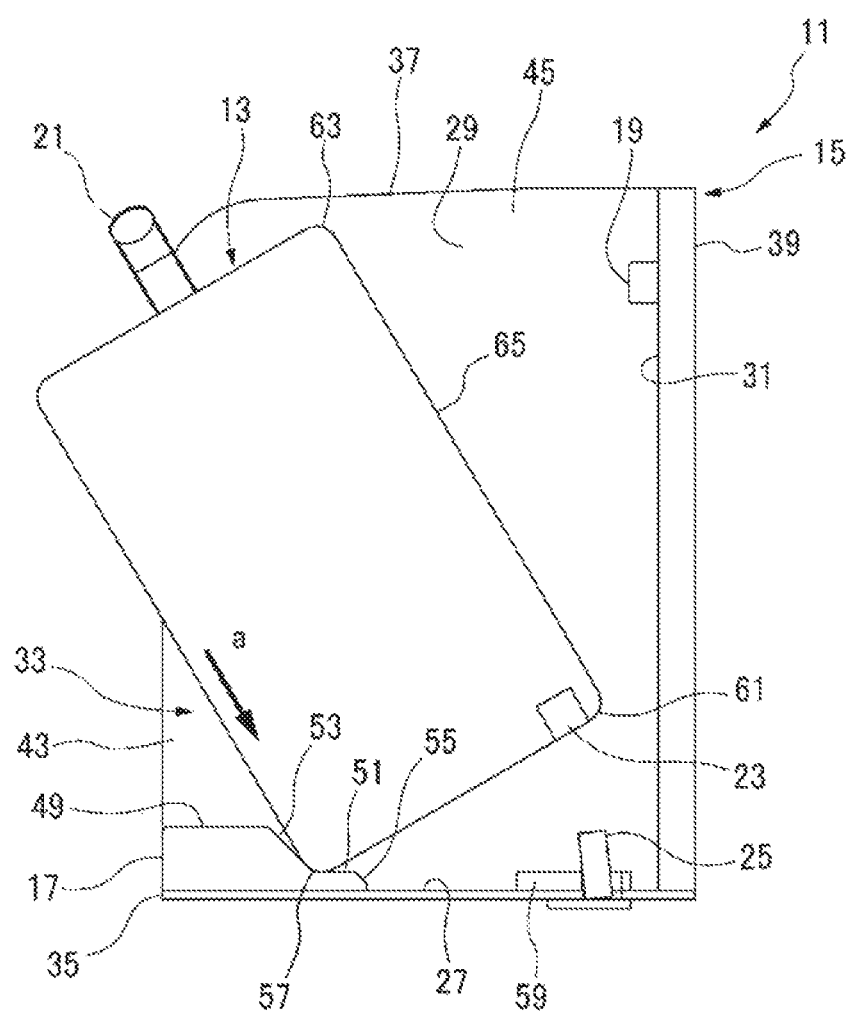
FIG. 5 is a view taken along line A-A in FIG. 4.

FIG. 4 is a front view of the storage body 15 and the package body 13 whose front edge portion 57 is grounded for explaining an operation of storing from the front opening portion 43. FIG. 5 is a view taken along line A-A in FIG. 4.

In order to store the package body 13 in the storage device 11 from the front opening portion 43, for example, the package body 13 is placed such that the front edge portion 57 abuts on the upper step flat surface 49 of the front guide 17. Thereafter, the package body 13 is pressed to a rear side (that is, the side of the back surface 31) and inserted therein, so that the front edge portion 57 moves toward the rear side (that is, toward the back surface 31) while abutting on the upper step flat surface 49. Further, the front edge portion 57 moves in an oblique direction (direction of arrow a in FIG. 5) from an end of the upper step flat surface 49 along the upper step inclined surface 53. When the package body 13 is further inserted into (in other words, pressed into) the upper step inclined surface 53 toward the rear side (that is, toward the back surface 31) along the front edge portion 57, the front edge portion 57 abuts against the lower step flat surface 51, so that the package body 13 is in a temporarily supported state.

Figure 6:
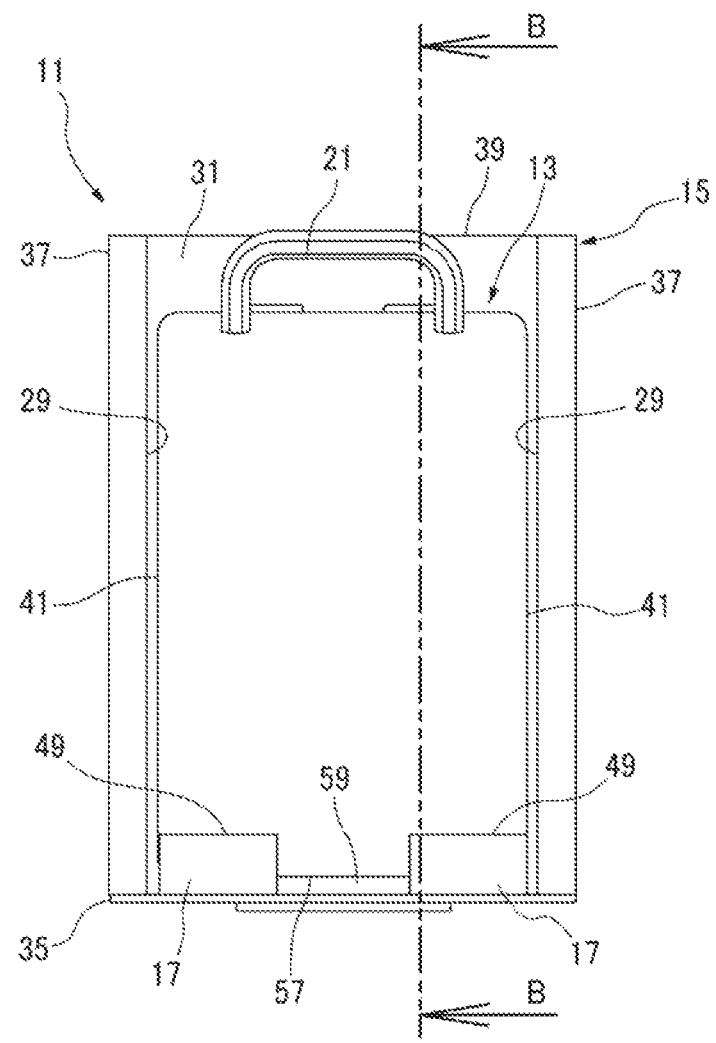
FIG. 6 is a front view of the storage body and the package body which is being raised for explaining the operation of storing from the front opening portion.
Figure 7:
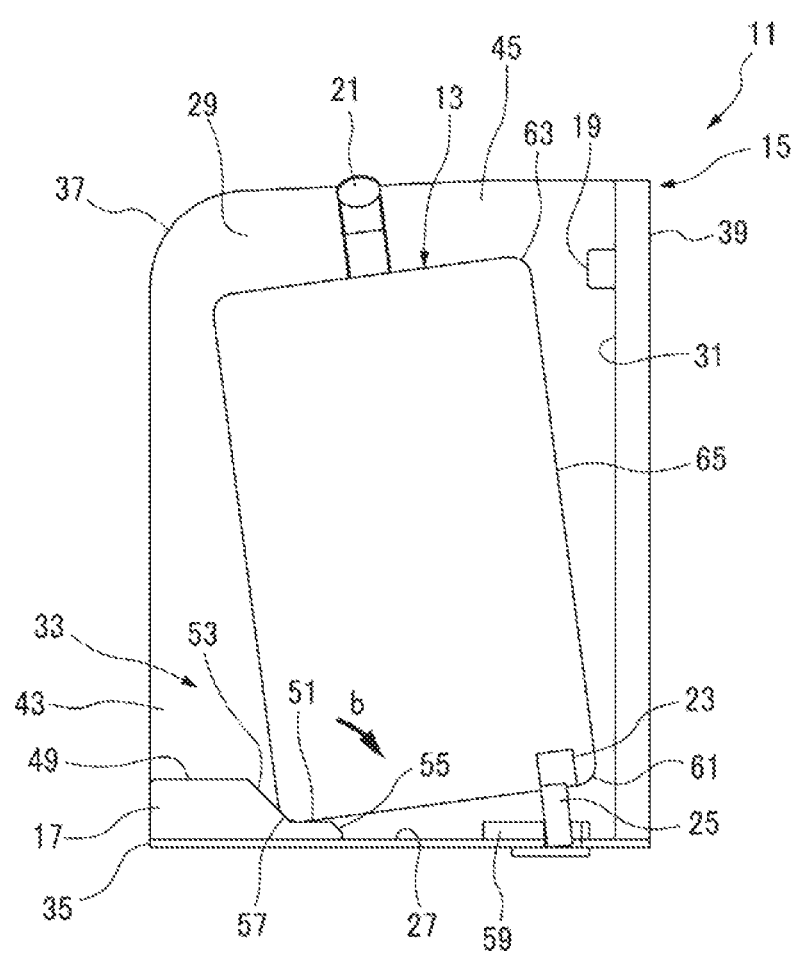
FIG. 7 is a view taken along line B-B in FIG. 6.

FIG. 6 is a front view of the storage body 15 and the package body 13 which is being raised for explaining the operation of storing from the front opening portion 43. FIG. 7 is a view taken along line B-B in FIG. 6. The package body 13 rotates in a direction in which a rear edge portion 63 of an upper portion thereof approaches the rear guide 19 (direction of arrow b in FIG. 7) with the front edge portion 57 serving as a fulcrum in a state where the front edge portion 57 is supported by the lower step flat surface 51. The coupled portion 23 provided on the rear edge portion 61 of the lower portion of the rotated package body 13 coincides with the coupling portion 25 of the bottom surface 27.

Figure 8:
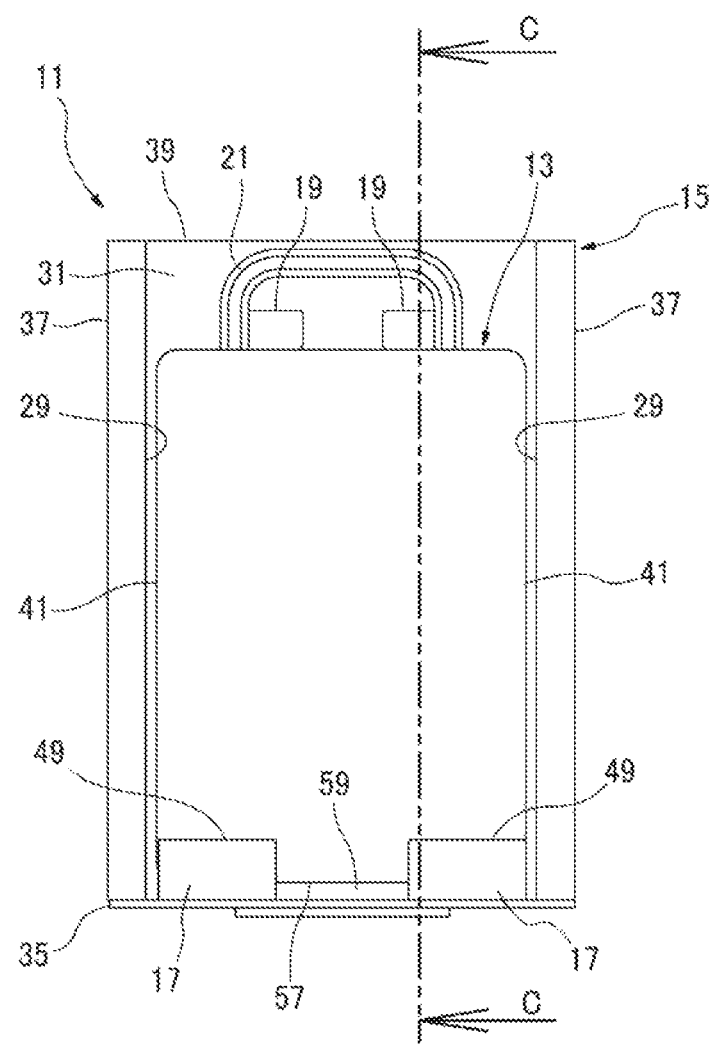
FIG. 8 is a front view of the storage body and the package body whose storage is completed for explaining the operation of storing from the front opening portion.
Figure 9:
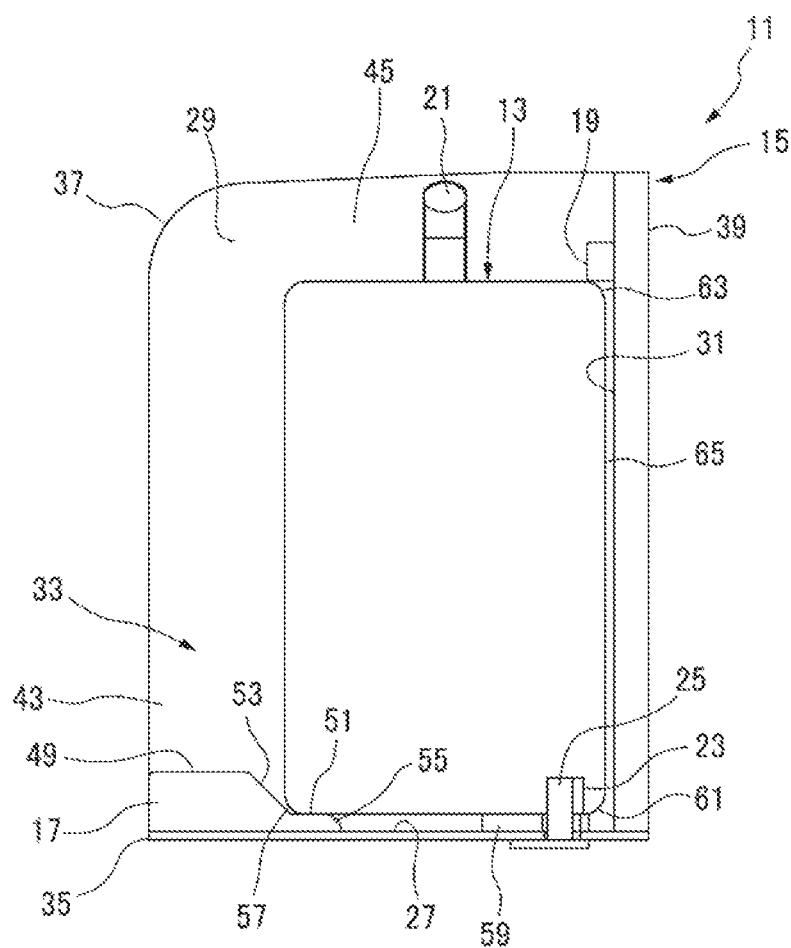
FIG. 9 is a view taken along line C-C in FIG. 8.

FIG. 8 is a front view of the storage body 15 and the package body 13 whose storage is completed for explaining the operation of storing from the front opening portion 43. FIG. 9 is a view taken along line C-C in FIG. 8. By further rotating the package body 13, the coupled portion 23 is coupled to the coupling portion 25. At this time, the coupling portion 25 rotates from the forwardly inclining posture to the upright posture. As a result, the package body 13 is stored in the storage body 15, and the coupling with the coupling portion 25 is completed.

Figure 10:
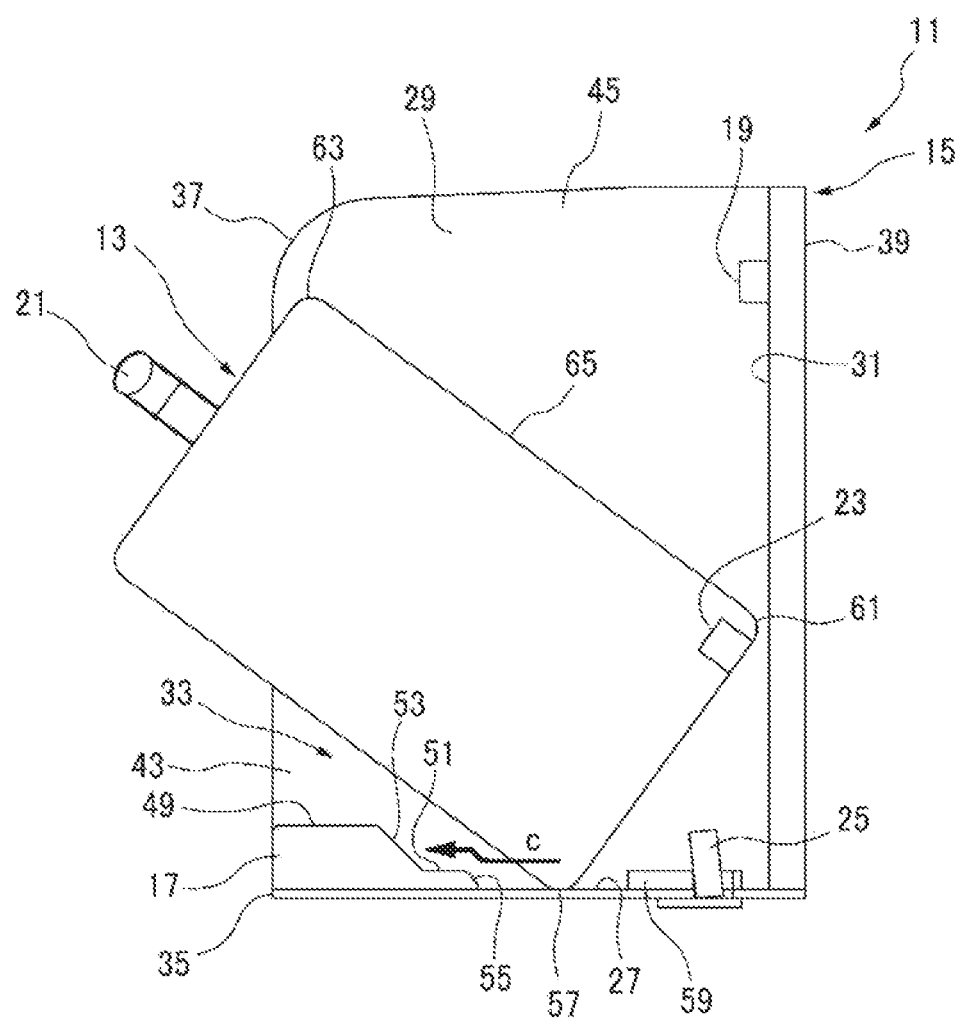
FIG. 10 is a side view of the storage body and the package body during movement (in other words, during storage) for explaining a storage operation in a case where the front edge portion is placed on a bottom surface.

FIG. 10 is a side view of the storage body 15 and the package body 13 during movement (in other words, during storage) for explaining a storage operation in a case where the front edge portion 57 is placed on the bottom surface 27. In the storage device 11, as shown in FIG. 10, it is also assumed that the front edge portion 57 of the lower portion of the package body 13 is inserted with a large inclination angle in the forwardly inclining posture while being in contact with the bottom surface 27. In this case, if the package body 13, whose front edge portion 57 is placed on the bottom surface 27, is pulled in a front direction (direction of arrow c in FIG. 10), the front edge portion 57 is climbed onto the lower step inclined surface 55 of the front guide 17. The package body 13 placed on the lower step flat surface 51 is pulled until the front edge portion 57 abuts against the upper step inclined surface 53. As a result, a state thereof becomes the same as the state shown in FIG. 5. Then the storage of the package body 13 and the coupling between the coupled portion 23 and the coupling portion 25 can be completed by the same operation as described above.

Store from Upper Opening Portion

Figure 11:
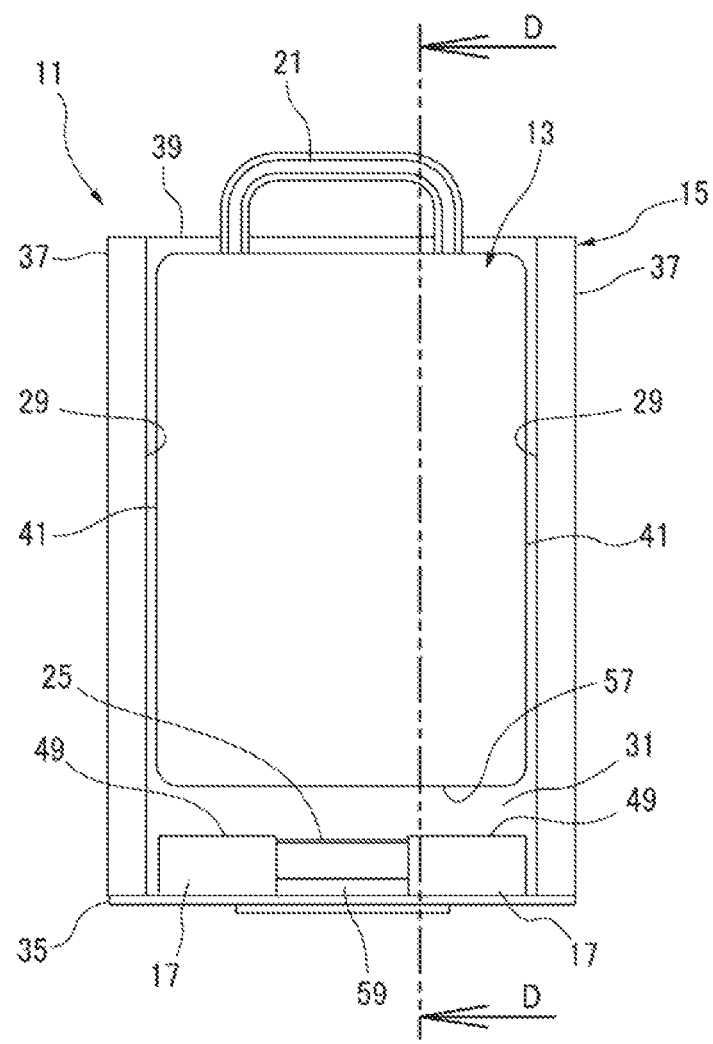
FIG. 11 is a front view of the storage body and the package body which is abutted against a rear guide for explaining an operation of storing from an upper opening portion.
Figure 12:
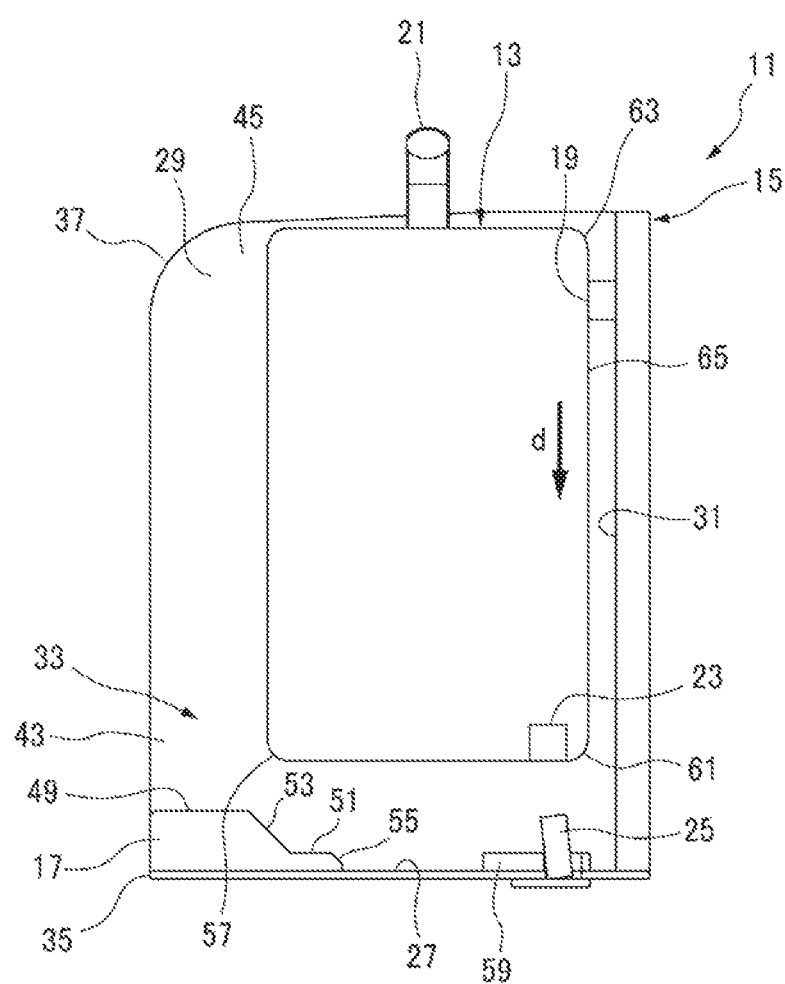
FIG. 12 is a view taken along line D-D in FIG. 11.

FIG. 11 is a front view of the storage body 15 and the package body 13 which is abutted against the rear guide 19 for explaining an operation of storing from the upper opening portion 45. FIG. 12 is a view taken along line D-D in FIG. 11. Meanwhile, in order to store the package body 13 from the upper opening portion 45 in the storage device 11, the package body 13 is inserted downward (in a direction of arrow d in FIG. 12) while a back surface 65 of the package body 13 is along the rear guide 19.

Figure 13:
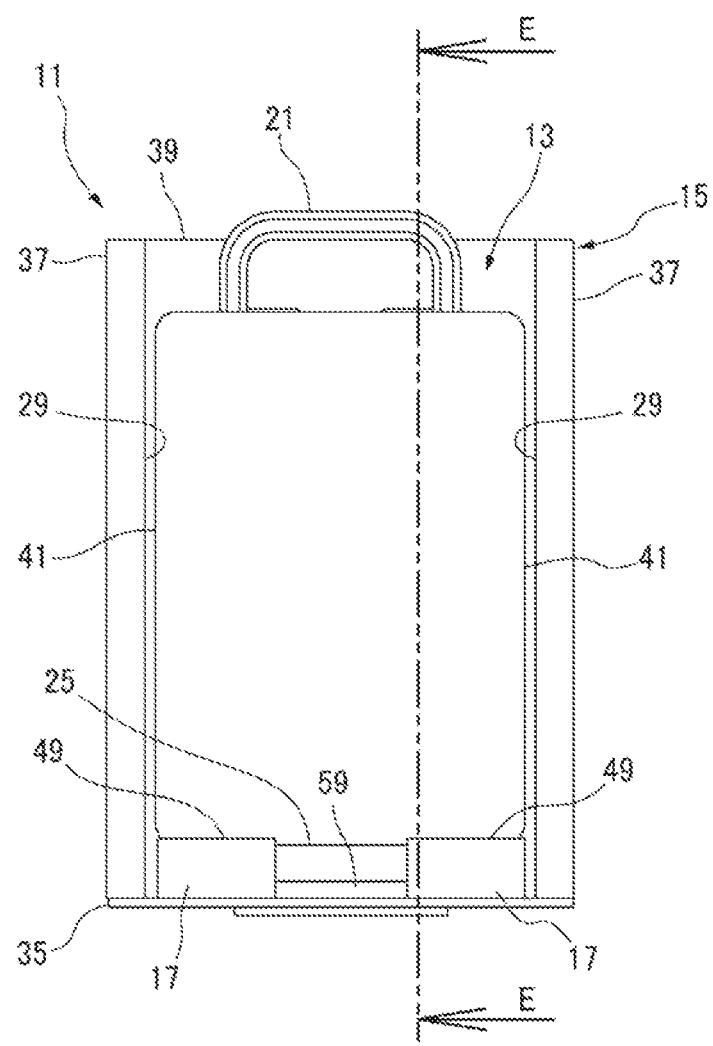
FIG. 13 is a front view of the storage body and the package body whose coupled portion coincides with a coupling portion for explaining the operation of storing from the upper opening portion.
Figure 14:
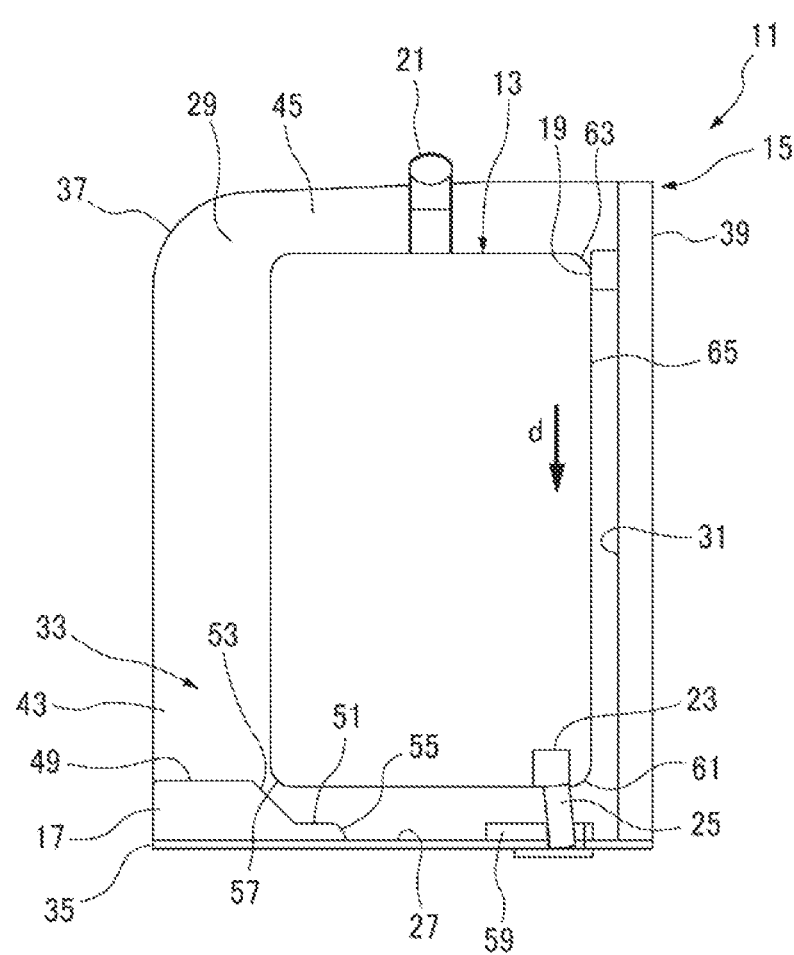
FIG. 14 is a view taken along line E-E in FIG. 13.

FIG. 13 is a front view of the storage body 15 and the package body 13 whose coupled portion 23 coincides with the coupling portion 25 for explaining the operation of storing from the upper opening portion 45. FIG. 14 is a view taken along line E-E in FIG. 13. The coupled portion 23 of the package body 13, which is lowered along the rear guide 19, coincides with the coupling portion 25. At this time, the coupling portion 25 is still held in the forwardly inclining posture. The front edge portion 57 of the package body 13 is still not in contact with the upper step inclined surface 53.

Figure 15:
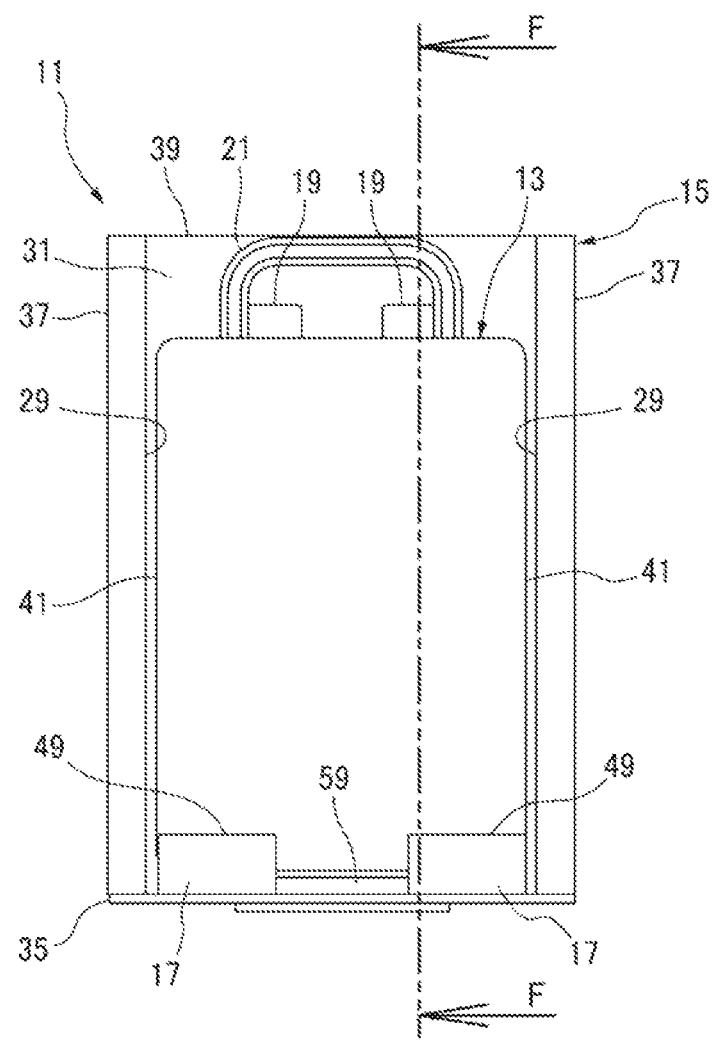
FIG. 15 is a front view of the storage body and the package body whose front edge portion is abutted against an upper step inclined surface for explaining the operation of storing from the upper opening portion.
Figure 16:
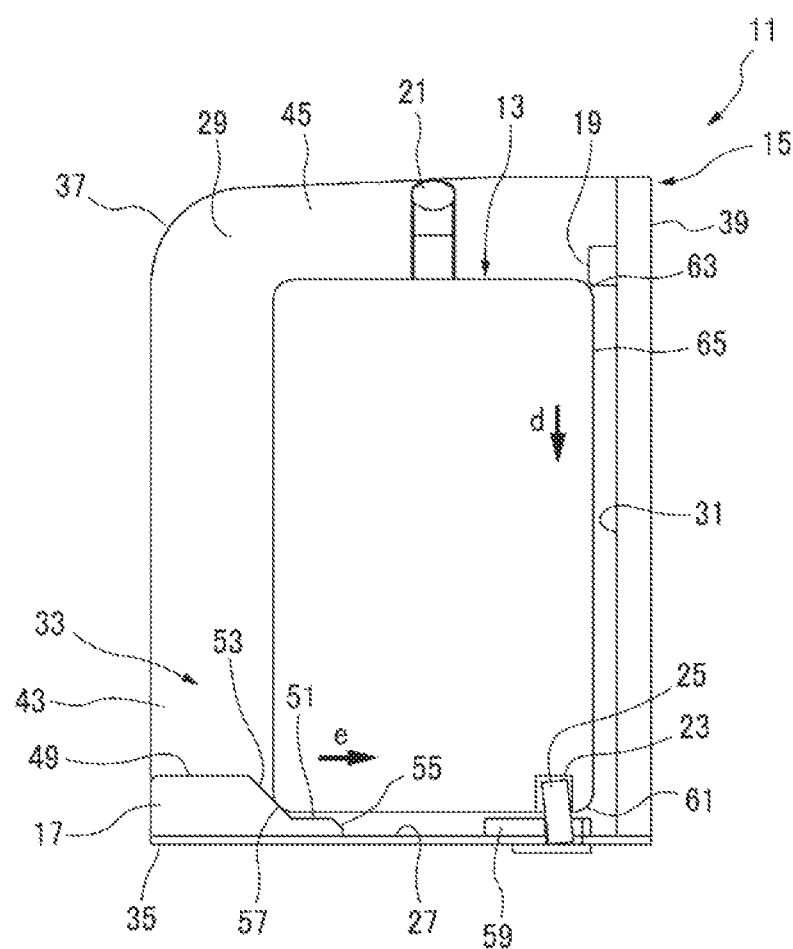
FIG. 16 is a view taken along line F-F in FIG. 15.

FIG. 15 is a front view of the storage body 15 and the package body 13 whose front edge portion 57 is abutted against the upper step inclined surface 53 for explaining the operation of storing from the upper opening portion 45. FIG. 16 is a view taken along line F-F in FIG. 15. The package body 13, whose coupled portion 23 coincides with the coupling portion 25, is further lowered. The coupled portion 23 of the package body 13 is started to be coupled to the coupling portion 25. At the same time, the front edge portion 57 of the package body 13 abuts on the upper step inclined surface 53. The package body 13 which is further lowered in this state receives a reaction force due to sliding contact with the upper step inclined surface 53, and moves in a direction in which the front edge portion 57 approaches the back surface 31 (direction of arrow e in FIG. 16).

As a result, the package body 13 moves obliquely downward toward the back side, the front edge portion 57 reaches the lower step flat surface 51, and the rear edge portion 63 of the upper portion enters a position below the rear guide 19. At the same time, due to the oblique movement of the package body 13, the coupling portion 25 is movable in an upright direction. As a result, the same state as in FIG. 9 is obtained, the package body 13 is stored in the storage body 15, and the coupling with the coupling portion 25 is completed.

Next, effects of the configuration of the storage device 11 according to the present embodiment will be described.

The storage body 15 of the storage device 11 according to the present embodiment includes: the bottom surface 27; the wall surfaces surrounding the storage space 33 (for example, the inner side surfaces 29 and the back surface 31); the front opening portion 43; and the upper opening portion 45, such that the package body 13 can be inserted into the storage space 33 from a plurality of directions. The front guide 17 includes the inclined surface 47 which is provided on the bottom surface 27 in proximity to the front opening portion 43 between the pair of inner side surfaces 29 and descends toward the back surface 31. The rear guide 19 restricts the upward movement of the package body 13 stored in the storage space 33, which is provided on the back surface 31 in proximity to the upper opening portion 45, along the back surface 31.

Therefore, in the storage device 11 according to the present embodiment, the storage space 33 of the storage body 15 is opened by the continuous front opening portion 43 and the upper opening portion 45. Even if the package body 13 inserted into the storage space 33 in the forwardly inclining posture is a heavy object (in other words, a load body), the package body 13 can be easily positioned at a storage completion position (set position) while a load thereof is supported along the inclined surface 47 of the front guide 17. The upper portion of the package body 13 in the forwardly inclining posture, whose load is supported, is raised toward the back surface 31 with a grounded portion serving as a center. The rear edge portion 63 of the upper portion of the package body 13, whose upper portion is raised, enters the position below the rear guide 19, and thus the storage toward the set position is completed.

On the other hand, the back surface 65 of the package body 13 inserted into the storage space 33 from the upper opening portion 45 comes into contact with the rear guide 19 and is lowered in a substantially vertical direction. When the front edge portion 57 of the lower portion abuts on the inclined surface 47 of the front guide 17, the lowered package body 13 is slightly moved rearward, and the rear edge portion 63 of the upper portion enters the position below the rear guide 19 to complete the storage toward the set position.

In this way, the package body 13 can be inserted from the front opening portion 43 and the upper opening portion 45 at any inclination angle. Since the rear edge portion 63 of the upper portion of the package body 13, which has been stored at the set position, enters the portion below the rear guide 19, easy lifting of the package body 13 in the upward direction (for example, upward in the vertical direction) from the storage space 33 is restricted. As a result, the storage device 11 has an effect of improving operability and reliability of protecting the object to be stored.

In the storage device 11, the coupling portion 25 which fits in the package body 13 is provided on the bottom surface 27. The coupling portion 25 is movably provided such that the coupling direction is inclined forward in the direction toward the front opening portion 43 before coupling with the package body 13, and the coupling direction is directed upward along the back surface 31 after coupling with the package body 13.

Therefore, in the storage device 11, the coupling direction of the coupling portion 25 is inclined forward in the direction toward the front opening portion 43 before coupling with the package body 13. That is, the coupling portion 25 waits for the coupling while maintaining the forwardly inclining posture until the coupling with the package body 13 starts. When the package body 13 inserted in the forwardly inclining posture is raised with the grounded portion serving as a center, since the coupled portion 23 moves along an arc trajectory, the coupling portion 25 can be easily aligned in the forwardly inclining posture which is inclined in a tangential direction of the arc. After the coupling with the package body 13 is completed, the coupling portion 25 is movable upward (for example, upward in the vertical direction) following the movement of the package body 13 to the upright posture. The forwardly inclining posture of the coupling portion 25 is set to an inclination angle that allows coupling of the package body 13 from the vertical direction. Therefore, in a case where the back surface 65 of the package body 13 comes into contact with the rear guide 19 and is lowered, the coupled portion 23 can receive the coupling portion 25 in the forwardly inclining posture. In this case, the coupling portion 25 that has entered the coupled portion 23 also follows the movement of the package body 13 in accordance with the completion of the storage toward the set position, and is movable upright to face upward.

The wall surfaces of the storage device 11 include the pair of parallel inner side surfaces 29 and the back surface 31.

Therefore, in the storage device 11, since insertion of the package body 13 sandwiched between the parallel inner side surfaces 29 can be improved by a person, the package body 13 can be inserted straight (in other words, without shaking obliquely) with respect to the back surface 31.

Further, in the storage device 11, the coupling portion 25 is provided closer to the back surface 31 than the front guide 17.

Therefore, in the storage device 11, since the coupling portion 25 is provided in proximity to the back surface 31, the coupling portion 25 is almost directly below the rear guide 19. As a result, the package body 13 can be more easily restricted from detaching from the coupling portion 25 caused by lifting of the package body 13 toward a vertical direction upper side as compared with a case where the coupling portion 25 is provided on a front surface opening side.

In the storage device 11, the pair of front guides 17 are provided apart from each other in the direction along the back surface 31.

Therefore, in the storage device 11, when the package body 13 is inserted into the storage space 33, the front edge portion 57 of the lower portion of the package body 13 can be supported by the pair of front guides 17 in the left-right direction. The front edge portion 57 of the lower portion of the package body 13 supported by the pair of front guides 17 in the left-right direction is easily positioned to be parallel to the bottom surface 27 and parallel to the back surface 31. As a result, the storage device 11 can smoothly (preventing excessive collision and friction with the inner side surfaces 29) operate from a temporary support position where the front edge portion 57 of the lower portion of the package body 13 is grounded until the completion of the storage.

In the storage device 11, the front guide 17 includes the upper step flat surface 49 which is in proximity to the front opening portion 43 and the lower step flat surface 51 located on the back surface side whose height from the bottom surface 27 is lower than that of the upper step flat surface 49. The inclined surface 47 includes the upper step inclined surface 53 which connects the upper step flat surface 49 and the lower step flat surface 51, and the lower step inclined surface 55 which connects the lower step flat surface 51 and the bottom surface 27.

Therefore, in the storage device 11, in the case where the protruding portion is provided on the bottom surface 27, the package body 13 can be floated from the bottom surface 27 and stored by supporting the lower surface of the package body 13 by the lower step flat surface 51. In this case, the package body 13, whose front edge portion 57 of the lower portion is directly placed on the bottom surface 27, can easily move the lower surface thereof onto the lower step flat surface 51 which serves as the support surface by climbing the front edge portion 57 of the lower portion onto the lower step inclined surface 55. The protruding portion may be, for example, the frame plate 59 of the coupling portion 25 or a slide plate.

Therefore, according to the storage device 11 according to the present embodiment, the object to be stored (for example, the package body 13) can be easily inserted, and the placed object to be stored can be restrained from coming off upward (for example, upward in the vertical direction).

Although the embodiment has been described above with reference to the drawings, it is needless to say that the present disclosure is not limited to such examples. It will be apparent to those skilled in the art that various changes and modifications can be conceived within the scope of the claims, and it should be understood that such changes and modifications also belong to the technical scope of the present disclosure. Constituent elements in the above-described embodiment may be optionally combined within a range not departing from the spirit of the invention.

The present disclosure is useful as a storage device which facilitates insertion of an object to be stored and also restrains the placed object to be stored from coming off upward in a vertical direction.

Reference signs used in the specification and drawings are listed as below.

11: Storage device
13: Package body
15: Storage body
17: Front guide
19: Rear guide
25: Coupling portion
27: Bottom surface
29: Inner side surface
31: Back surface
33: Storage space
43: Front opening portion
45: Upper opening portion
47: Inclined surface
49: Upper step flat surface
51: Lower step flat surface
53: Upper step inclined surface
55: Lower step inclined surface

What is claimed is:

1. A storage device comprising:
   a storage body, which includes a bottom surface, wall surfaces surrounding a storage space, a front opening portion and an upper opening portion such that a package body is enabled to be inserted into the storage space from a plurality of directions;
   a front guide, which is provided on the bottom surface in proximity to the front opening portion, and includes an inclined surface descending toward a surface on a back side of the storage space among the wall surfaces; and
   a rear guide, which is provided on the surface on the back side in proximity to the upper opening portion, and restricts upward movement of the package body stored in the storage space along the surface on the back side,
   wherein the bottom surface has provided thereon a coupling portion which is configured to fit in the package body, and
   wherein the coupling portion is movably provided such that a coupling direction thereof is inclined forward in a direction toward the front opening portion before coupling with the package body, and the coupling direction is directed upward along the surface on the back side after coupling with the package body.

2. The storage device according to claim 1, wherein the wall surfaces include a pair of parallel inner side surfaces and a back surface.

3. The storage device according to claim 2, wherein the coupling portion which is configured to fit in the package body is provided closer to the back surface than the front guide.

4. The storage device according to claim 1, wherein the front guide is a pair of front guides provided apart from each other in a direction along the surface on the back side.

5. The storage device according to claim 1, wherein the coupling portion is arranged in a posture forwardly inclining toward the front opening portion by a spring member.

6. The storage device according to claim 1, wherein the package body is a rechargeable battery.

7. The storage device according to claim 1, wherein the coupling portion is a connector.

8. The storage device according to claim 1, wherein the rear guide is a protruding portion.

9. A storage device comprising:
a storage body, which includes a bottom surface, wall surfaces surrounding a storage space, a front opening portion and an upper opening portion such that a package body is enabled to be inserted into the storage space from a plurality of directions;
a front guide, which is provided on the bottom surface in proximity to the front opening portion, and includes an inclined surface descending toward a surface on a back side of the storage space among the wall surfaces; and
a rear guide, which is provided on the surface on the back side in proximity to the upper opening portion, and restricts upward movement of the package body stored in the storage space along the surface on the back side,
wherein the front guide includes an upper step flat surface which is in proximity to the front opening portion and a lower step flat surface located behind the upper step flat surface when viewed in a front opening portion side, whose height from the bottom surface is lower than that of the upper step flat surface, and
wherein the inclined surface includes an upper step inclined surface which connects the upper step flat surface and the lower step flat surface.

10. The storage device according to claim 9, wherein the inclined surface further includes a lower step inclined surface which connects the lower step flat surface and the bottom surface.

\* \* \* \* \*